United States Patent
Bagepalli et al.

(10) Patent No.: US 10,461,959 B2
(45) Date of Patent: Oct. 29, 2019

(54) PROGRAMMABLE INFRASTRUCTURE GATEWAY FOR ENABLING HYBRID CLOUD SERVICES IN A NETWORK ENVIRONMENT

(71) Applicant: Cisco Technology, Inc., San Jose, CA (US)

(72) Inventors: Nagaraj A. Bagepalli, Fremont, CA (US); David Wei-Shen Chang, Milpitas, CA (US); Abhijit Patra, Saratoga, CA (US); Murali Anantha, Sunnyvale, CA (US); Prashanth Thumbargudi, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/693,340

(22) Filed: Aug. 31, 2017

(65) Prior Publication Data

US 2017/0366373 A1     Dec. 21, 2017

Related U.S. Application Data

(63) Continuation of application No. 14/297,436, filed on Jun. 5, 2014, now Pat. No. 9,755,858.

(Continued)

(51) Int. Cl.
*H04L 12/64* (2006.01)
*H04L 12/66* (2006.01)
(Continued)

(52) U.S. Cl.
CPC .......... *H04L 12/6418* (2013.01); *H04L 12/66* (2013.01); *H04L 41/022* (2013.01);
(Continued)

(58) Field of Classification Search
CPC ......... H04L 12/66; H04L 41/022–0233; H04L 41/0246–0253; H04L 41/0266–0293;
(Continued)

(56) References Cited

U.S. PATENT DOCUMENTS

| 6,108,782 A | 8/2000 | Fletcher et al. |
| 6,343,290 B1 | 1/2002 | Cossins et al. |

(Continued)

FOREIGN PATENT DOCUMENTS

| CN | 101394360 | 7/2011 |
| CN | 102164091 | 8/2011 |

(Continued)

OTHER PUBLICATIONS

"Enterprise Cloud Gateway (ECG)—Policy driven framework for managin multi-cloud environments," CSS Corp., 2014 CSS Corp., originally published on or about Feb. 11, 2012, 1 page, http://www.css-cloud.com/plafform/enterprise-cloud-gateway.php.

(Continued)

*Primary Examiner* — Eric Myers
(74) *Attorney, Agent, or Firm* — Polsinelli PC

(57) ABSTRACT

An example method for a programmable infrastructure gateway for enabling hybrid cloud services in a network environment is provided and includes receiving an instruction from a hybrid cloud application executing in a private cloud, interpreting the instruction according to a hybrid cloud application programming interface, and executing the interpreted instruction in a public cloud using a cloud adapter. The method is generally executed in the infrastructure gateway including a programmable integration framework allowing generation of various cloud adapters using a cloud adapter software development kit, the cloud adapter being generated and programmed to be compatible with a specific public cloud platform of the public cloud. In specific (Continued)

embodiments, identical copies of the infrastructure gateway can be provided to different cloud service providers who manage disparate public cloud platforms; each copy of the infrastructure gateway can be programmed differently to generate corresponding cloud adapters compatible with the respective public cloud platforms.

20 Claims, 8 Drawing Sheets

Related U.S. Application Data

(60) Provisional application No. 61/979,870, filed on Apr. 15, 2014.

(51) Int. Cl.
*H04L 29/06* (2006.01)
*H04L 12/24* (2006.01)

(52) U.S. Cl.
CPC .......... *H04L 41/0246* (2013.01); *H04L 41/08* (2013.01); *H04L 65/102* (2013.01)

(58) Field of Classification Search
CPC ......... H04L 41/08–0803; H04L 41/084–0846; H04L 41/0893; H04L 41/18–24; H04L 41/28; H04L 65/10; H04L 65/102–104; H04L 65/1063; H04L 67/08
See application file for complete search history.

(56) References Cited

U.S. PATENT DOCUMENTS

| | | |
|---|---|---|
| 6,721,804 B1 | 4/2004 | Rubin et al. |
| 6,733,449 B1 | 5/2004 | Krishnamurthy et al. |
| 7,277,948 B2 | 10/2007 | Igarashi et al. |
| 7,480,672 B2 | 1/2009 | Hahn et al. |
| 7,496,043 B1 | 2/2009 | Leong et al. |
| 7,917,647 B2 | 3/2011 | Cooper et al. |
| 8,028,071 B1 | 9/2011 | Mahalingam et al. |
| 8,041,714 B2 | 10/2011 | Aymeloglu et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,301,746 B2 | 10/2012 | Head et al. |
| 8,345,692 B2 | 1/2013 | Smith |
| 8,406,141 B1 | 3/2013 | Couturier et al. |
| 8,495,356 B2 | 7/2013 | Ashok et al. |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,663 B2 | 10/2013 | Baucke et al. |
| 8,590,050 B2 | 11/2013 | Nagpal et al. |
| 8,630,291 B2 | 1/2014 | Shaffer et al. |
| 8,639,787 B2 | 1/2014 | Lagergren et al. |
| 8,660,129 B1 | 2/2014 | Brendel et al. |
| 8,719,804 B2 | 5/2014 | Jain |
| 8,775,576 B2 | 7/2014 | Hebert et al. |
| 8,805,951 B1 | 8/2014 | Faibish et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 9,015,324 B2 | 4/2015 | Jackson |
| 9,043,439 B2 | 5/2015 | Bicket et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,164,795 B1 | 10/2015 | Vincent |
| 9,167,050 B2 | 10/2015 | Durazzo et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,264,478 B2 | 2/2016 | Hon et al. |
| 9,313,048 B2 | 4/2016 | Chang et al. |
| 9,361,192 B2 | 6/2016 | Smith et al. |
| 9,380,075 B2 | 6/2016 | He et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,613,078 B2 | 4/2017 | Vermeulen et al. |
| 9,658,876 B2 | 5/2017 | Chang et al. |
| 9,692,802 B2 | 6/2017 | Bicket et al. |
| 9,755,858 B2 | 9/2017 | Bagepalli et al. |
| 2002/0143928 A1 | 10/2002 | Maltz et al. |
| 2002/0174216 A1 | 11/2002 | Shorey et al. |
| 2003/0018591 A1 | 1/2003 | Komisky |
| 2003/0228585 A1 | 12/2003 | Inoko et al. |
| 2006/0126665 A1 | 6/2006 | Ward et al. |
| 2008/0201711 A1 | 8/2008 | Amir Husain |
| 2008/0235755 A1 | 9/2008 | Blaisdell et al. |
| 2009/0019367 A1 | 1/2009 | Cavagnari |
| 2009/0138763 A1 | 5/2009 | Arnold |
| 2009/0177775 A1 | 7/2009 | Radia et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0042720 A1 | 2/2010 | Stienhans |
| 2010/0191783 A1 | 7/2010 | Mason et al. |
| 2010/0205601 A1 | 8/2010 | Abbas et al. |
| 2010/0211782 A1 | 8/2010 | Auradkar et al. |
| 2010/0318609 A1 | 12/2010 | Lahiri et al. |
| 2010/0325199 A1 | 12/2010 | Park et al. |
| 2010/0333116 A1 | 12/2010 | Prahlad et al. |
| 2011/0035754 A1 | 2/2011 | Srinivasan |
| 2011/0072489 A1 | 3/2011 | Parann-Nissany |
| 2011/0075667 A1 | 3/2011 | Li et al. |
| 2011/0126099 A1 | 5/2011 | Anderson et al. |
| 2011/0173303 A1 | 7/2011 | Rider |
| 2011/0219434 A1 | 9/2011 | Betz et al. |
| 2011/0231899 A1 | 9/2011 | Puller et al. |
| 2011/0239039 A1 | 9/2011 | Dieffenbach et al. |
| 2011/0252327 A1 | 10/2011 | Awasthi et al. |
| 2011/0261828 A1 | 10/2011 | Smith |
| 2011/0276675 A1 | 11/2011 | Singh et al. |
| 2011/0276951 A1 | 11/2011 | Jain |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0054367 A1 | 3/2012 | Ramakrishnan et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0214506 A1 | 8/2012 | Skaaksrud et al. |
| 2012/0222106 A1 | 8/2012 | Kuehl |
| 2012/0240113 A1 | 9/2012 | Hur |
| 2012/0265976 A1 | 10/2012 | Spiers et al. |
| 2012/0281706 A1 | 11/2012 | Agarwal et al. |

(56) References Cited

U.S. PATENT DOCUMENTS

| | | |
|---|---|---|
| 2012/0290647 A1 | 11/2012 | Ellison et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0091557 A1 | 4/2013 | Gurrapu |
| 2013/0097601 A1 | 4/2013 | Podvratnik et al. |
| 2013/0111540 A1 | 5/2013 | Sabin |
| 2013/0124712 A1 | 5/2013 | Parker |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159496 A1 | 6/2013 | Hamilton et al. |
| 2013/0160008 A1 | 6/2013 | Cawlfield et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0075357 A1 | 3/2014 | Flores et al. |
| 2014/0108985 A1 | 4/2014 | Scott et al. |
| 2014/0156557 A1 | 6/2014 | Zeng et al. |
| 2014/0164486 A1 | 6/2014 | Ravichandran et al. |
| 2014/0189095 A1 | 7/2014 | Lindberg et al. |
| 2014/0189125 A1 | 7/2014 | Amies et al. |
| 2014/0222953 A1 | 8/2014 | Karve et al. |
| 2014/0282536 A1 | 9/2014 | Dave et al. |
| 2014/0282889 A1 | 9/2014 | Ishaya et al. |
| 2014/0297569 A1 | 10/2014 | Clark et al. |
| 2014/0317261 A1 | 10/2014 | Shatzkamer et al. |
| 2014/0366155 A1 | 12/2014 | Chang et al. |
| 2015/0043576 A1 | 2/2015 | Dixon et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0106802 A1 | 4/2015 | Ivanov et al. |
| 2015/0106805 A1 | 4/2015 | Melander et al. |
| 2015/0120914 A1 | 4/2015 | Wada et al. |
| 2015/0242204 A1 | 8/2015 | Hassine et al. |
| 2015/0281067 A1 | 10/2015 | Wu |
| 2015/0281113 A1 | 10/2015 | Siciliano et al. |
| 2015/0319063 A1 | 11/2015 | Zourzouvillys et al. |
| 2015/0326524 A1 | 11/2015 | Tankala et al. |
| 2015/0373108 A1 | 12/2015 | Fleming et al. |
| 2016/0062786 A1 | 3/2016 | Meng et al. |
| 2016/0099886 A1 | 4/2016 | Melander et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0188527 A1 | 6/2016 | Cherian et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2017/0005948 A1 | 1/2017 | Melander et al. |
| 2017/0024260 A1 | 1/2017 | Chandrasekaran et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0264663 A1 | 9/2017 | Bicket et al. |
| 2017/0339070 A1 | 11/2017 | Chang et al. |

FOREIGN PATENT DOCUMENTS

| | | |
|---|---|---|
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| WO | WO 2009/155574 | 12/2009 |
| WO | WO 2010/030915 | 3/2010 |
| WO | WO 2013/158707 | 10/2013 |

OTHER PUBLICATIONS

Author Unknown, "5 Benefits of a Storage Gateway in the Cloud," Blog, TwinStrata, Inc., Jul. 25, 2012, XP055141645, 4 pages, https://web.archive.com/web/20120725092619/http://blog.twinstrata.com/2012/07/10//5-benefits-of-a-storage-gateway-in-the-cloud.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

Author Unknown, "Open Data Center Alliance Usage: Virtual Machine (VM) Interoperability in a Hybrid Cloud Environment Rev. 1.2," Open Data Center Alliance, Inc., 2013, 18 pages.

Author Unknown, "Real-Time Performance Monitoring on Juniper Networks Devices, Tips and Tools for Assessing and Analyzing Network Efficiency," Juniper Networks, Inc., May 2010, 35 pages.

Beyer, Steffen, "Module "Data::Locations?!"," YAPC::Europe, London, UK,ICA, Sep. 22-24, 2000, XP002742700, 15 pages.

Borovick, Lucinda, et al., "Architecting the Network for the Cloud," IDC White Paper, Jan. 2011, 8 pages.

Bosch, Greg, "Virtualization," last modified Apr. 2012 by B. Davison, 33 pages.

Broadcasters Audience Research Board, "What's Next," http:///www.barb.co.uk/whats-next, accessed Jul. 22, 2015, 2 pages.

Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.

Cisco Systems, Inc., "Cisco Unified Network Services: Overcome Obstacles to Cloud-Ready Deployments," Cisco White Paper, Jan. 2011, 6 pages.

Cisco Systems, Inc., "Cisco Intercloud Fabric: Hybrid Cloud with Choice, Consistency, Control and Compliance," Dec. 10, 2014, 22 pages.

Cisco Technology, Inc., "Cisco Expands Videoscape TV Platform Into the Cloud," Jan. 6, 2014, Las Vegas, Nevada, Press Release, 3 pages.

Fang K., "LISP MAC-EID-TO-RLOC Mapping (LISP based L2VPN)," Network Working Group, Internet Draft, Cisco Systems, Jan. 2012, 12 pages.

Herry, William, "Keep It Simple, Stupid: OpenStack nova-scheduler and its algorithm", May 12, 2012, IBM, 12 pages.

Hewlett-Packard Company, "Virtual context management on network devices", Research Disclosure, vol. 564, No. 60, Apr. 1, 2011, Mason Publications, Hampshire, GB, Apr. 1, 2011, 524.

Juniper Networks, Inc., "Recreating Real Application Traffic in Junosphere Lab," Solution Brief, Dec. 2011, 3 pages.

Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.

(56) References Cited

OTHER PUBLICATIONS

Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology" http://www.nielsen-admosphere.eu/products-and-services/simmetry-audience-measurement-technology/, accessed Jul. 22, 2015, 6 pages.
Nielsen, "Television" http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017 https://docs.openstack.org/nova/latest/user/filter-scheduler.html.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (UNIX)", Wikipedia, May 4, 2014, 4 pages, https://en.wikipedia.org/w/index.php?title=Pipeline2/028Unix%29&oldid=606980114.
Amedro, Brian, et al., "An Efficient Framework for Running Applications on Clusters, Grids and Cloud," 2010, 17 pages.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," May 22, 2013, 30 pages.
Citrix, "Deployment Practices and Guidelines for NetScaler 10.5 on Amazon Web Services," White Paper, citrix.com, 2014, 14 pages.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Kunz, Thomas, et al., "OmniCloud—The Secure and Flexible Use of Cloud Storage Services," 2014, 30 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Mu, Shuai, et al., "uLibCloud: Providing High Available and Uniform Accessing to Multiple Cloud Storages," 2012 IEEE, 8 pages.
Szymaniak, Michal, et al., "Latency-Driven Replica Placement", vol. 47 No. 8, IPSJ Journal, Aug. 2006, 12 pages.
Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Ye, Xianglong, et al., "A Novel Blocks Placement Strategy for Hadoop," 2012 IEEE/ACTS 11th International Conference on Computer and Information Science, 2012 IEEE, 5 pages.

```
// Management Session
public abstract class AbstactGenericSession {
    createSession (Account account),
    getSession( ),
    validateSession( ),
};

// Provider related Operations
public abstract class AbstactGenericProviderDetails {
    listCapabilities ( );
    listCloudTypes ( );
    listRegions( );
    listHypervisors ( );
    listServiceOfferings ( );
    listApis ( );
    listPublicIpAddress (string vpcid);
};

// VPC related Operations
public abstract class AbstactGenericVPC {
    getOrganization ( ),
    createVPC ( ),
    listVPCs ( ),
    deleteVPC (string vpcid),
    updateVPC (string vpcid, VPC vpc),
    restartVPC (string vpcid),
    retrieveVPC (string vpcid),
};
```

FIG. 4

PROGRAMMABLE INFRASTRUCTURE GATEWAY FOR ENABLING HYBRID CLOUD SERVICES IN A NETWORK ENVIRONMENT

CROSS-REFERENCE TO RELATED APPLICATION

This application is a continuation of U.S. application Ser. No. 14/297,436 entitled "PROGRAMMABLE INFRASTRUCTURE GATEWAY FOR ENABLING HYBRID CLOUD SERVICES IN A NETWORK ENVIRONMENT," filed on Jun. 5, 2014, which in turn claims the benefit of priority to U.S. Provisional Application No. 61/979,870, entitled "PROGRAMMABLE INFRASTRUCTURE GATEWAY FOR ENABLING HYBRID CLOUD SERVICES," filed Apr. 15, 2014, all of which is hereby incorporated by reference in their entirety.

TECHNICAL FIELD

This disclosure relates in general to the field of communications and, more particularly, to a programmable infrastructure gateway for enabling hybrid cloud services in a network environment.

BACKGROUND

According to latest trends in networking, the future enterprise information technology (IT) infrastructure is a hybrid cloud. The hybrid cloud is a cloud computing environment where some computing resources are managed in-house by an organization and other computing resources are provided and managed externally. For example, the organization may use a public cloud service, such as Amazon® Simple Storage Service (Amazon S3™) for archived data and continue to maintain in-house storage for operational enterprise data. In a general sense, the term "cloud" includes a collection of hardware and software forming a shared pool of configurable computing resources (e.g., networks, servers, storage, applications, services, etc.) that can be suitably provisioned to provide on-demand self-service, network access, resource pooling, elasticity and measured service, among other features. The hybrid cloud approach can allow organizations to scale computing resources in a cost-effective manner, allow for disaster recovery, and provide additional storage (among other advantages) through the public cloud computing environment without exposing mission-critical applications and data to third-party vulnerabilities.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 is a simplified block diagram illustrating yet other example details of embodiments of the communication system;

DETAILED DESCRIPTION OF EXAMPLE EMBODIMENTS

Overview

An example method for a programmable infrastructure gateway for enabling hybrid cloud services in a network environment is provided and includes receiving an instruction from a hybrid cloud application executing in a private cloud, interpreting the instruction according to a hybrid cloud application programming interface, and executing the interpreted instruction in a public cloud using a cloud adapter. The method is generally executed in the infrastructure gateway including a programmable integration framework allowing generation of various cloud adapters using a cloud adapter software development kit, the cloud adapter being generated and programmed to be compatible with a specific public cloud platform of the public cloud.

As used herein, a cloud that is owned, maintained and operated by a corporate (or individual) entity wholly utilizing the cloud's computing resources is referred to as a "private cloud;" a cloud operated by a third-party cloud service provider with computing resources partitioned and provided to various consumers (including corporations and individuals) on an on-demand basis is referred to herein as a "public cloud." An "Application Programming Interface" (API) specifies a set of functions and/or routines that accomplish a specific task or are allowed to interact with a specific software component. In a general sense, the API exposes certain public classes (e.g., functions, routines, software components) while keeping the details of the classes hidden. As used herein, the term "software development kit" refers to a set of software tools that allows for creation of applications, such as cloud adapters. As used herein, the term "cloud adapter" refers to a software utility (e.g., application) that controls transfer of information between local back office systems (e.g., located in the private cloud) and the public cloud.

Example Embodiments

Figure 1:
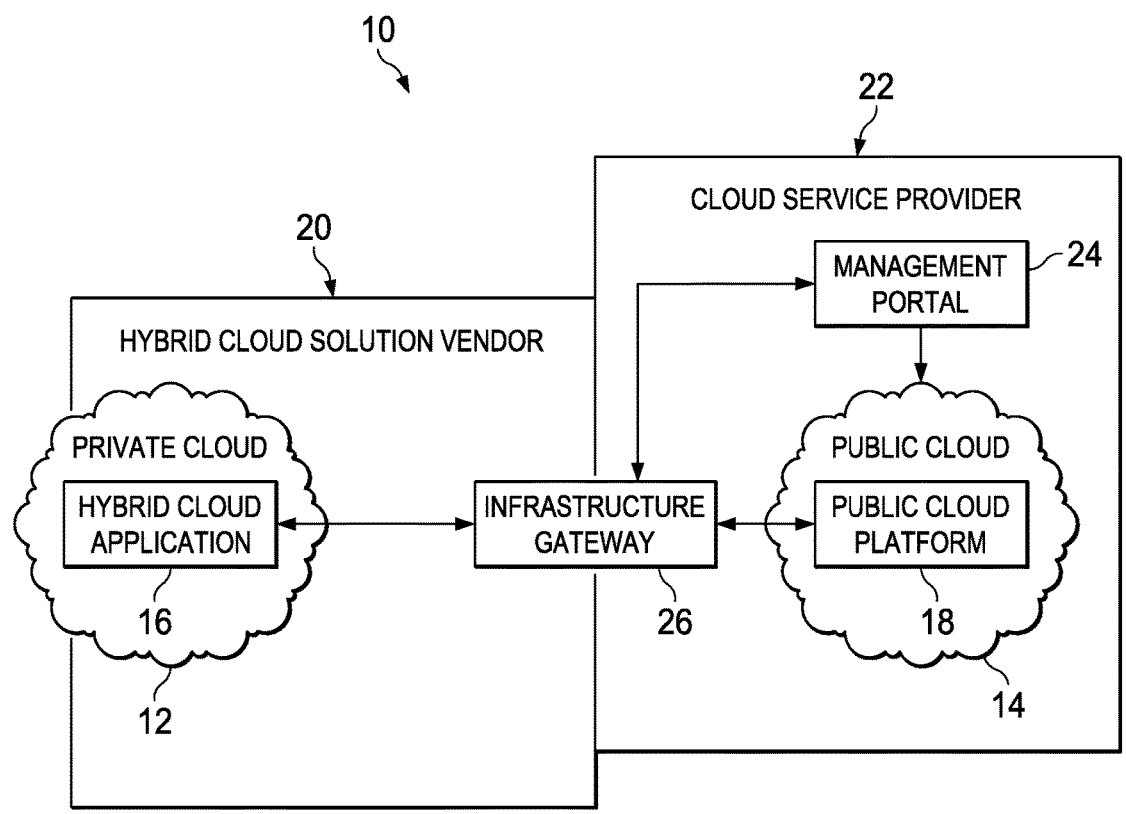
FIG. 1 is a simplified block diagram illustrating a communication system for a programmable infrastructure gateway for enabling hybrid cloud services in a network environment.

Turning to FIG. 1, FIG. 1 is a simplified block diagram illustrating a communication system 10 including a programmable infrastructure gateway for enabling hybrid cloud services in a network environment in accordance with one example embodiment. FIG. 1 illustrates a private cloud 12 and a public cloud 14 that are linked together and managed through a hybrid cloud application 16. A public cloud platform 18 provides computing resources in public cloud 14 to users in private cloud 12. Public cloud platform 18 comprises a specific software environment in which computing resources of public cloud 14 can execute. Examples of public cloud platform 18 include Amazon® Web Services (AWS) and Microsoft® Azure. A specific instance of public cloud platform 18 includes a set of computing, network, and storage resources configured according to a specific software (e.g., operating) environment. Although only one instance of public cloud platform 18 is shown in the figure, any number of instances of public cloud platform 18 may be included within the broad scope of the embodiments.

Hybrid cloud application 16 may be generated, provided, and/or serviced by a hybrid cloud solution vendor 20. Public cloud 14 may be owned and operated by a cloud service provider 22, who manages public cloud platform 18 through a management portal 24. An infrastructure gateway 26 may interface with private cloud 12 and public cloud 14 to allow hybrid cloud solution vendor 20 to integrate with several different cloud platforms, including public cloud platform 18, in parallel and with minimal effort in a secure, future-proof and trusted fashion.

As used herein, the term "cloud service provider" refers to a company (or individual) that offers some component of cloud computing—typically Infrastructure as a Service (IaaS), Software as a Service (SaaS) or Platform as a Service (PaaS)—to other businesses or individuals according to a service level agreement (SLA). For example, a typical cloud storage SLA may specify precise levels of service—such as, 99.9% uptime—and the recourse or compensation that the user is entitled to should the cloud service provider fail to provide the service as described. Examples of cloud service providers include Amazon®, Google®, Citrix®, IBM®, Rackspace®, Salesforce.com®, etc.

As used herein, the term "hybrid cloud solution vendor" refers to a company (or individual) that develops, sells, and/or maintains hybrid cloud applications (e.g., 16) that can be used to interconnect private clouds (e.g., 12) with public clouds (e.g., 14) in a secure and seamless manner. Examples of hybrid cloud solution vendors include NetApp®, Cisco®, Rackspace. Many cloud service providers also provide hybrid cloud solutions to interface with their individual cloud platforms. Thus many cloud service providers can also be hybrid solution vendors.

As used herein, the term "management portal" refers to a software platform with a user interface and other portals (e.g., web based portal) to help cloud service providers (e.g., 22) manage delivery of cloud services and offering to their customers. For example, Citrix CloudPortal Services Manager™ is a management portal with a control panel to manage provisioning and delegated administration of hosted cloud desktops, applications and business services.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Hybrid cloud represents an IT provisioning approach, where enterprises consume a combination of private and public cloud resources to fulfill their corporate IT requirements. Hybrid cloud facilitates various IT user cases such as shadow IT (e.g., solutions specified and deployed by departments other than the IT department), development and test, peak workload, and disaster recovery. The hybrid approach can bridge the infrastructures of both private and public clouds for fulfilling the use cases. Infrastructure includes substantially every aspect of a cloud management platform, comprising computing processor, hypervisor, image format, networking, storage, cloud orchestration application programming interfaces (APIs), authentication methodology, security policy, administration tickets, troubleshooting process, corporate compliance policy, disaster recovery requirements, etc.

A couple of approaches for implementing the hybrid cloud approach include: (1) building a cloud adapter in the private cloud (e.g., enterprise IT) management platform; and (2) deploying an infrastructure gateway in the public cloud to resolve the discrepancies between two cloud infrastructures. The cloud adapter is a common approach used by many cloud orchestration solution vendors. In a general sense, the cloud adapter connects the cloud platform to the enterprise network and translates an instruction received from the enterprise network into a cloud API call applicable to the specific cloud platform (e.g., Amazon EC2®, vCloud Director, OpenStack, etc.). The typical cloud adapter executes on a server (e.g., virtual or physical).

However, building the cloud adapter is typically not scalable. Whereas many hybrid cloud solution vendors develop cloud adapters for major tier 1 cloud service providers like Amazon Web Services (AWS) and Microsoft® Azure, there appears to be no motivation to support tier two or tier three cloud service providers (e.g., tier 2 and tier 3 cloud service providers are smaller and less well known cloud service providers as compared to a tier 1 cloud service provider; the tier 2 and tier 3 cloud service providers are typically limited in their geographic coverage and capabilities).

Moreover, cloud service providers who do not provide a mature cloud management API are typically not supported by the hybrid cloud solution vendors with appropriate cloud adapters. Many tier 2/3 cloud service providers do not offer cloud management API for various reasons, including: they do not have a strong technology IT team; they may be looking for a better public cloud solution; they may have security concerns associated with programming the API interface; without a public cloud API, it would be difficult to provide hybrid cloud service to their customers; etc. Because competition in public cloud markets can be ferocious, missing an opportunity to provide hybrid cloud services can put such cloud service providers in a disadvantaged position.

Further, because cloud platforms can be substantially disparate from each other, hybrid cloud solution vendors may have to put in tremendous effort to develop different cloud adapters for multiple cloud service providers and maintain the different adapter codes when the corresponding cloud providers update their cloud API. The worst case can be when cloud providers switch completely to a new cloud platform. For example, some cloud service providers may change their cloud platforms from vCloud Director to Openstack, thereby completely invalidating existing cloud adapters.

At least one cloud adapter solution includes multiple cloud adapters configured to interface with disparate cloud platforms. In contrast to a conventional cloud management module, the multi-cloud management module enables a user to provision and configure computing resources from a plurality of heterogeneous enterprise-maintained and third-party cloud-based service offerings, each cloud having different administrative or provisioning interfaces implemented with different APIs, and having disparate underlying virtualization software (e.g., thereby requiring variations in particular configuration settings and/or formats for machine images upon which each instance of a virtual server or virtual appliance is based). The multi-cloud management module provides a common administrative interface for provisioning resources (e.g., virtual servers or virtual appliances) in different clouds. The multi-cloud management module includes several cloud adapters, each configured to receive and analyze a non-cloud-specific message, and then convert or translate the non-cloud-specific message into a cloud-specific message compatible with a cloud management module of the cloud with which the cloud adapter is associated. The multi-cloud management module resides and executes on an enterprise-maintained server or in a third-party cloud.

In contrast, the infrastructure gateway involves inserting a gateway appliance (e.g., network device) into the cloud service provider's cloud stacks for providing an infrastructure bridging function for the cloud service provider's enterprise customers. Deploying the infrastructure gateway appliance at the cloud service providers' cloud can help address several challenges associated with hybrid cloud use cases. However, currently available infrastructure gateway appliances do not offer programmable (e.g., configurable, customizable, etc.) interfaces for working in multiple cloud service provider cloud platforms (e.g., to enable disparate cloud service providers to add their own proprietary code). In other words, currently available infrastructure gateway appliances are tailored to meet requirements of only one cloud platform at a time; a particular infrastructure gateway appliance that works for a specific public cloud platform will not work and cannot be re-programmed to work for another public cloud platform.

For example, CSS Corporation's Enterprise Cloud Gateway (ECG) acts as a governor, establishing a policy driven access gateway for managing hybrid and multi cloud environments. In particular, ECG implements AWS® Web Services End Point specification and translates to other target cloud provider web services calls to establish a cloud agnostic services framework. IT policies relevant to resource utilization, usage limits across cloud providers, security group definition, machine image standardization etc. can be managed using the ECG (e.g., with an Amazon EC2 compatible API). The ECG includes an adapter framework consisting of a set of publicly available or specific cloud adapters, such as AWS adapter, Eucalyptus adapter, Openstack adapter and Rackspace adapter. However, the ECG does not appear to be programmable to include custom adapters tailored to a specific proprietary cloud platform.

Further, cloud service providers continue to use scripts to provision and manage resources for their tenants in the cloud. It is virtually impossible for any hybrid cloud solution to be provided in such an environment, as the scripts are proprietary to the cloud service provider and cannot be used on any other cloud platforms either. Further, complexity and heterogeneity of cloud platforms is constantly increasing due to various kinds of different components and XaaS (e.g., IaaS, PaaS, SaaS) offerings employed in cloud applications and the dependencies among them. The complexity may further increase if the components and XaaS offerings employ different management technologies and have to be combined and customized during provisioning. With the use of custom scripts, application-specific provisioning and customization tasks such as wiring custom components and standard XaaS offerings together cannot be implemented in a generic and reusable way.

Communication system 10 is configured to address these issues (among others) to offer a system and method for a programmable infrastructure gateway for enabling hybrid cloud services in a network environment. According to various embodiments, embodiments of communication system 10 may provide an integration framework that allows cloud service provider 22 (and other similar cloud service providers) to program any new and/or updated cloud service interfaces using an open cloud API interface that could be used with hybrid cloud application 16.

According to embodiments of communication system 10, infrastructure gateway 26 may use HTTPs connections to communicate with hybrid cloud application 16 and public cloud platform 18, and Representational state transfer (REST) based communication to interface with management portal 24. Infrastructure gateway 26 may receive an instruction from hybrid cloud application 16 executing in private cloud 12. A suitable hybrid cloud API in infrastructure gateway 26 may interpret the instruction. The interpreted instruction may be executed through a suitable cloud adapter in public cloud platform 18 at public cloud 14. In many embodiments, infrastructure gateway 26 may include a programmable integration framework allowing generation of various cloud adapters using a cloud adapter software development kit (SDK), the cloud adapter for public cloud platform 18 being generated and programmed to be specifically compatible therewith.

In some embodiments, infrastructure gateway 26 may receive a management instruction from management portal 24. A cloud management API may interpret the management instruction. The interpreted instruction may be executed through the cloud adapter in public cloud platform 18 at public cloud 14. The cloud management API can include various functions, such as (a) provisioning computing resources in public cloud 14 for various users, (b) monitoring resource usage, (c) metering resource usage, (d) configuring appliances in public cloud 14, and (e) analyzing resource usage in public cloud 14.

Programming the integration framework can include using the SDK to generate the cloud adapter to be compatible with public cloud platform 18 and configuring management parameters and cloud orchestration code for public cloud platform 18. In various embodiments, the SDK includes a set of abstract classes inheritable by various cloud adapters as sub-classes suited to their respective codes. Each of the cloud adapters that inherits the abstract classes implements the actual functions of the corresponding sub-classes. In some embodiments, infrastructure gateway 26 includes a plurality of cloud adapters, each cloud adapter conforming to a different cloud platform managed by a different service provider; some cloud adapters may include embedded pre-installed cloud adapters, whereas other cloud adapters in infrastructure gateway comprises programmable adapters that can be tailored by, for example, cloud service provider 22, to custom fit public cloud platform 18.

Embodiments of communication system 10 maintain separate trust domains corresponding to cloud service provider 22 and hybrid cloud solution vendor 20. Cloud service provider 22's trust domain comprises cloud service provider 22's proprietary cloud orchestration code; hybrid cloud solution vendor 20's trust domain comprises hybrid cloud solution vendor 20's proprietary integration framework. The trust domains are separate in part because changes to cloud service provider 22's proprietary cloud orchestration code do not affect hybrid cloud solution vendor 20's proprietary integration framework, and vice versa. In many embodiments, substantially identical copies of infrastructure gateway 26 can be provided (e.g., by hybrid cloud solution vendor 20) to several different cloud service providers who manage disparate public cloud platforms. Each copy of infrastructure gateway 26 can be programmed differently by the respective cloud service providers (e.g., by software developers, administrators, engineers and/or other employees of the cloud service providers) to generate corresponding cloud adapters compatible with the respective public cloud platforms.

Embodiments of communication system 10 offer several advantages: programmable infrastructure gateway 26 enables cloud service provider 22 to support a communication channel with hybrid cloud application 16 running at a private cloud 16 through a programmable interface in a secure and flexible manner; the scaled approach facilitated by embodiments of communication system 10 allows multiple cloud service providers to participate with hybrid cloud application 16 in parallel and hybrid cloud solution vendors do not have to spend tremendous effort to integrate with each cloud service provider one at a time; embodiments of communication system 10 can facilitate future proof, for example, creating an ecosystem between hybrid cloud solution vendors and cloud service providers. After infrastructure gateway 16 is installed and integrated with both clouds (e.g., private cloud 12 and public cloud 14), both parties (hybrid cloud solution vendor 20 and cloud service provider 22) of the ecosystem can propose new features and add to the hybrid cloud solution seamlessly. Embodiments of communication system 10 provide a trust model that can separately protect intellectual property of hybrid cloud solution vendors and cloud service providers.

Turning to the infrastructure of communication system 10, the network topology can include any number of servers, hardware accelerators, virtual machines, switches (including distributed virtual switches), routers, and other nodes interconnected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network. The example network environment may be configured over a physical infrastructure that may include WLANs (including Bluetooth), and wired LANs.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, infrastructure gateway 26 can comprise a physical appliances (e.g., stand-alone box) plugged into public cloud 14 appropriately. In other embodiments, infrastructure gateway 26 can comprise an application executing in a server or other network element in public cloud 14. In yet other embodiments, infrastructure gateway 26 can comprise a combination of the above. In various embodiments, private cloud 12 and public cloud 14 can comprise myriad virtual and physical servers, computers, appliances and other network elements. As used herein, the term 'network element' is meant to encompass computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Figure 2:
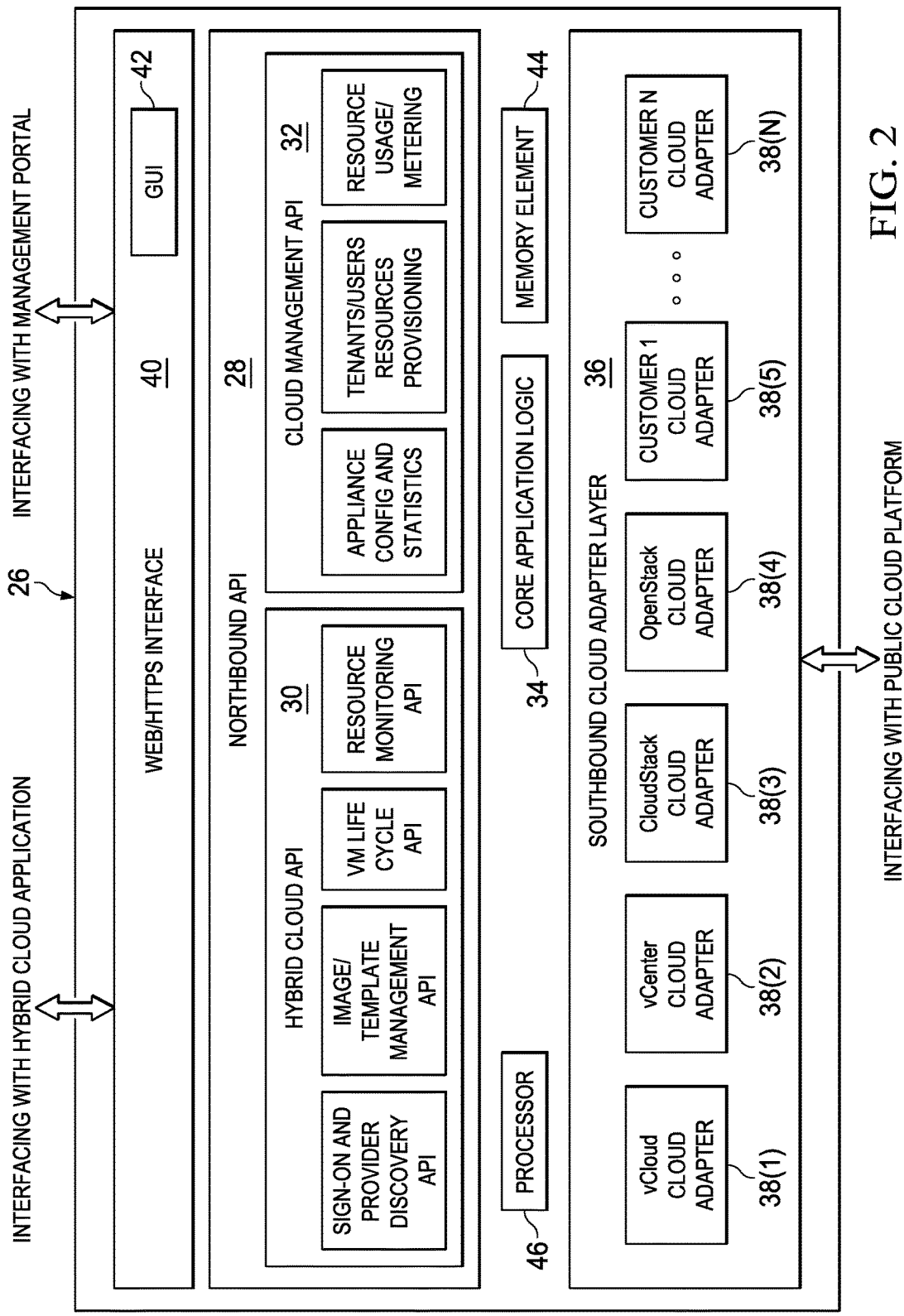
FIG. 2 is a simplified block diagram illustrating example details of an embodiment of the communication system.

Turning to FIG. 2, FIG. 2 is a simplified block diagram illustrating example details of an embodiment of communication system 10. Infrastructure gateway 26 comprises various functional components, including Northbound API 28, which implements a hybrid cloud API 30 and a cloud management API 32. Hybrid cloud API 30 may be consumed by hybrid cloud application 16 for workload migration and provisioning purpose; if cloud service provider 22 cannot offer a cloud orchestration API, hybrid cloud API 30 can provide the missing functionality. In some embodiments, hybrid cloud API 30 may comprise a REST based API. Examples of supported functions include returning cloud resource capabilities (e.g. image type, virtualization type, cloud model, etc.) on a GET command; returning a list of all provider virtual private clouds (VPCs) and the networks contained in it; uploading an image (e.g., of a virtual machine (VM), etc.); deleting an image; and other such functions; create VM instance on public cloud platform 18; etc.

In a general sense, the orchestration tools supported by hybrid cloud API 30 can comprise a collection of automated software functions that invoke one of several underlying cloud resource component functions such as, a cloud provisioning function (e.g., for performing provisioning operations on different computing resources, including hardware, software, personas of VM images, etc.), service validation and tracking functions, a cloud conditioning function, etc. The cloud resource components are typically computer-coded software that execute on cloud server provider 22's backend computing devices (e.g., in public cloud 14), controlling the cloud resources (e.g., processors, memory elements, etc.) available to particular software applications.

Cloud management API 32 implements a set of cloud provider APIs for cloud service provider (SP) administrators to use, for example, to configure the appliance, to provision tenants and users, to monitor tenants operations and any other customization, etc. In many embodiments, cloud management API 32 can facilitate various functions, such as (a) provisioning computing resources in public cloud 14 for various users, (b) monitoring resource usage, (c) metering resource usage, (d) configuring appliances (e.g., LDAP, cloud platforms, etc.) in public cloud 14, and (e) analyzing certain resource usage (e.g., appliance statistics, number of cloud API requests, responses received/transmitted, etc.) in public cloud 14.

Tenant and resource provisioning APIs provided in cloud management API 32 may support provisioning tenants' and users' information, provisioning resource domains for tenant, and generating and/or managing per tenant secret access keys, managing per-tenant resource usage limit and per-tenant resource usage metering, managing per-tenant resource monitoring, and managing tenant relevant statistics (among other functions).

A core application logic 34 implements an application logic of infrastructure gateway 26, for example, tenant resource usage metering and tenant resources monitoring. For example, core application logic 34 may facilitate hybrid cloud API backend processing. Based on the cloud platform type configured for the tenant, appropriate cloud adapter functions may be called for fulfilling cloud orchestration requests issued by hybrid cloud application 16. Based on per tenant resource usage limits (e.g. number of vCPUs, memory size, and storage size) pre-configured for a given tenant, a usage limit may be enforced by core application logic 34. Another function collects all the relevant resource usages for the use of usage metering applications based on the cloud resource allocation and provisioning requests and responses. Yet another function issues relevant cloud platform API requests for resource monitoring purposes.

A southbound cloud adapter layer 36 implements a set of cloud platform specific interfacing cloud adapters 38(1)-38(N). Each of cloud adapters 38(1)-38(N) is responsible for interfacing with a specific cloud platform. For example, cloud adapter 38(1) interfaces with VMware vCloud Director™; cloud adapter 38(2) interfaces with VMware® vCenter™; cloud adapter 38(3) interfaces with CloudStack™; cloud adapter 38(4) interfaces with OpenStack™; etc. Some of cloud adapters 38(1)-38(N), such as cloud adapters 38(1)-38(4) may comprise embedded pre-installed cloud adapters. Other cloud adapter, for example, 38(5), 38(N) may comprise programmable cloud adapters tailored for specific public cloud platforms.

Southbound cloud adapter layer 36 provides a programmable integration framework, which allows cloud service provider 22 to add proprietary logic and to build custom tailored cloud adapters. For example, cloud adapter 38(5) may be programmed using cloud service provider 22's proprietary cloud orchestration logic to generate a special custom made cloud adapter tailored to work exclusively with public cloud platform 18. Any number of such programmable and non-programmable cloud adapters may be made available within infrastructure gateway 26 according to embodiments of communication system 10.

Infrastructure gateway 26 may also include a suitable interface 40 (e.g., web/HTTPS interface) with an appropriate graphical user interface (GUI) 42. A memory element 44 and a processor 42 may facilitate the operations described herein. In a general sense, infrastructure gateway 26 provides two virtual network interfaces; one interface is for hybrid cloud application 16 to reach infrastructure gateway 26 from public networks, the other interface is for infrastructure gateway 16 to make connections with public cloud platform 18.

During configuration of infrastructure gateway 26 to operate for public cloud platform 18, hybrid cloud solution vendor 20 may program infrastructure gateway 26 with hybrid cloud API 30. Hybrid cloud solution vendor 20 may provide infrastructure gateway 26 to cloud service provider 22 along with an SDK for generating cloud adapters, as needed. In one example embodiment, cloud service provider 22 may use the SDK to generate a custom cloud adapter, for example, cloud adapter 38(5). In another example embodiment, cloud service provider 22 may use one of the embedded pre-installed cloud adapters, for example, cloud adapter 38(1).

During operation, an instruction received from hybrid cloud application 16 may be interpreted by hybrid cloud API 30 and translated by core application logic 34 into an appropriate cloud adapter function. The cloud adapter function may be interpreted by cloud adapter, for example, 38(5) according to its programmed logic (e.g., proprietary logic) and executed accordingly on public cloud platform 18.

Figure 3:
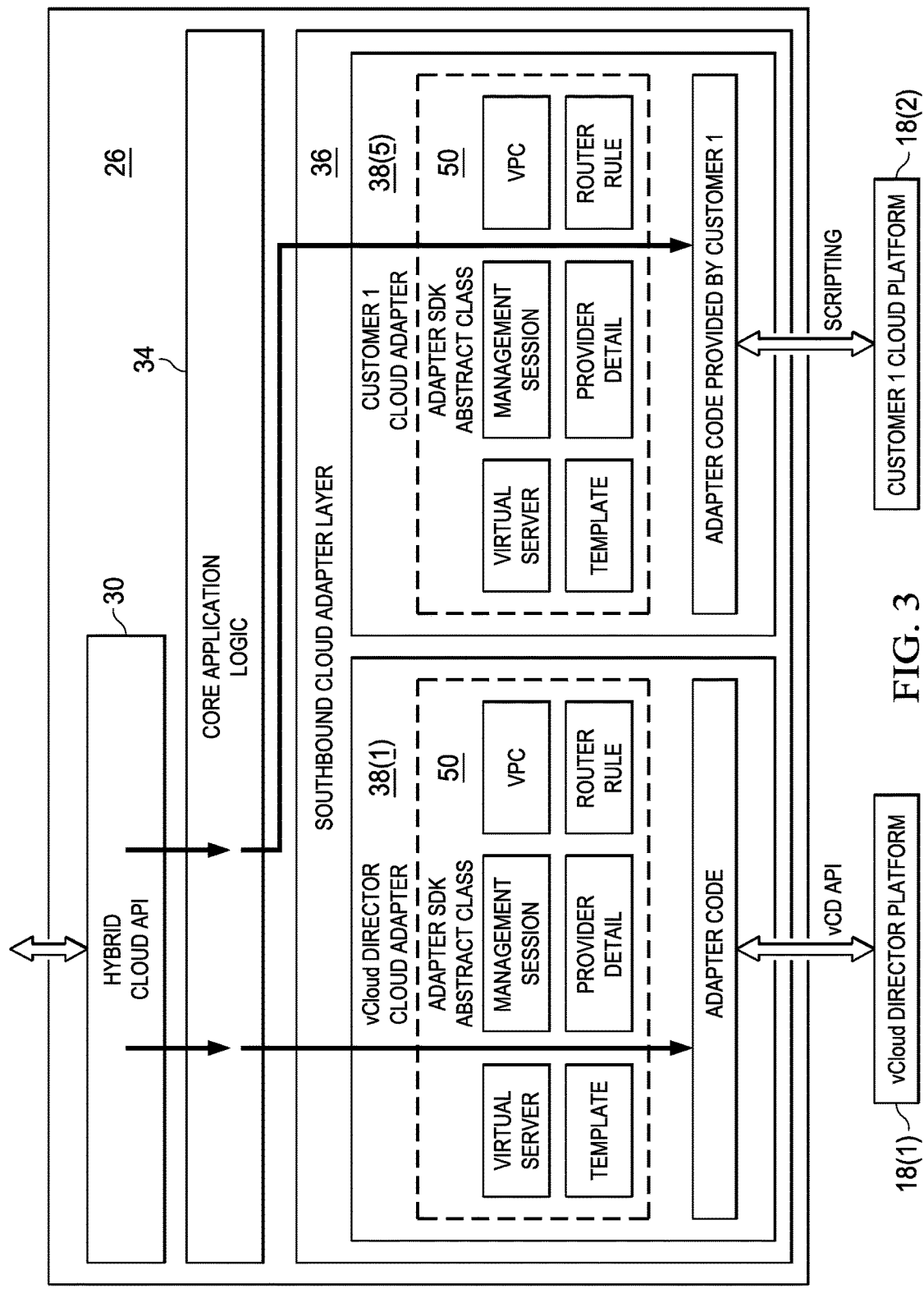
FIG. 3 is a simplified block diagram illustrating other example details of embodiments of the communication system.

Turning to FIG. 3, FIG. 3 is a simplified block diagram illustrating example details of an embodiment of communication system 10. Southbound adapter layer 36 implements a set of adapter SDK abstract classes 50 as a backend module for processing hybrid cloud instructions (e.g., requests, function calls, etc.) received from hybrid cloud application 16. In some embodiments, adapter SDK abstract classes 50 may comprise Java based abstract classes.

Adapter SDK abstract classes 50 are inheritable by various cloud adapters (e.g., 38(1), 38(5)) as sub classes. Each cloud adapter (e.g., 38(1), 38(5)) that inherits SDK abstract classes 50 implements the actual functions (e.g., methods) of the sub classes. In one example, implementing the actual function of the sub-classes can involve issuing an API request to the targeted public cloud platforms (e.g., 18(1), 18(2), respectively) and expecting an asynchronous receipt of an API response therefrom. Cloud service providers who want to develop a custom cloud adapter onto infrastructure gateway 26 can use the SDK framework.

Examples of adapter SDK abstract classes 50 include a management session (e.g., create and validate a management session), provider details (e.g., get cloud platform capabilities, types, software offerings, etc.), VPC (e.g., create VPC, delete VPC, etc.), template (e.g., create template based on given image, upload an image for creating a template, etc.), router rule (e.g., list NAT rules of gateway, create NAT rule, delete NAT rule, create firewall, etc.), and virtual server (e.g., deploy virtual machine in cloud platform, destroy VM, start VM, etc.).

In a general sense, abstract classes 50 cannot be instantiated; they can only be sub-classes. When a specific abstract class is sub-classed, the sub-class usually provides implementations for all of the abstract methods in its parent class. The abstract classes may be specified through various input variables, methods and output variables. For example, createSession(Account) creates a management session in the public cloud platform 18; getSession(Account) gets detailed information of the management session; updateNatRule (Gateway ID, rule ID, rule) updates a NAT rule for the specified gateway; etc.

Adapter SDK abstract classes 50 can be sub-classed (or extended) according to suitable logic to implement functions comprising custom cloud adapter 38(5). During sub-classing, specific extensions may be added to the abstract class to tailor it according to the proprietary logic for cloud adapter 38(5). Note that embedded pre-installed cloud adapter 38(1) may also include subclasses of adapter SDK abstract classes 50 appropriately.

Turning to FIG. 4, FIG. 4 is a simplified diagram illustrating an example SDK 52 according to an embodiment of communication system 10. SDK 52 declarations may include various abstract classes 50, for example, AbstractGenericSession (e.g., management session abstract class), AbstractGenericProviderDetails (e.g., Provider details abstract class), etc.

Figure 5:
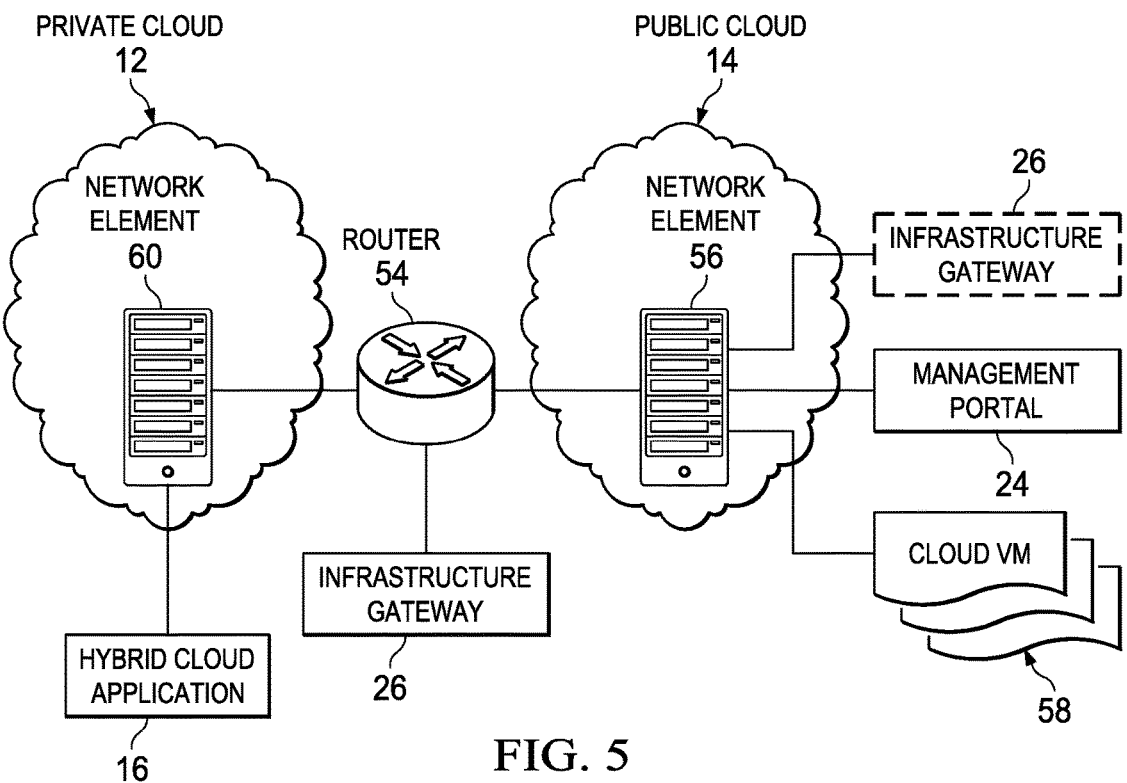
FIG. 5 is a simplified block diagram illustrating yet other example details of embodiments of the communication system.

Turning to FIG. 5, FIG. 5 is a simplified block diagram illustrating example details according to an embodiment of communication system 10. In some embodiments, infrastructure gateway 26 may be implemented on an edge router 54 located in public cloud 14. For example, infrastructure gateway 26 may execute in a stand-alone box connected to edge router 54. In other embodiments, infrastructure gateway 26 may be implemented in a network element 56 (e.g., server) located in public cloud 14 and exposed to edge router 54, as indicated by the dotted block representing infrastructure gateway 26. Note that management portal 24, and one or more cloud VMs 58 may be implemented in the same or different network element 56 in public cloud 14. Hybrid cloud application 16 may be implemented in a separate network element 60 in private cloud 12.

Figure 6:
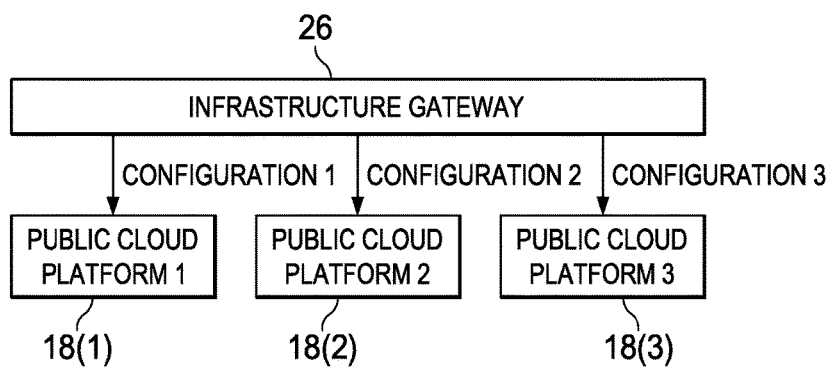
FIG. 6 is a simplified block diagram illustrating yet other example details of embodiments of the communication system.

Turning to FIG. 6, FIG. 6 is a simplified block diagram illustrating example details according to an embodiment of communication system 10. Infrastructure gateway 26 may be programmed according to configuration 1 to be compatible with public cloud platform 18(1). Programming includes generating the appropriate cloud adapter (using the adapter SDK) and setting management parameters and cloud orchestration code appropriately. For example, public cloud platform 18(1) may comprise a proprietary platform (e.g., not open source, or publicly available). The same infrastructure gateway 26 (or a substantially identical copy thereof) may be programmed according to configuration 2 to be compatible with public cloud platform 18(2), which may comprise an open source cloud platform (e.g., OpenStack). The same infrastructure gateway 26 (or a substantially identical copy thereof) may be programmed according to configuration 3 to be compatible with public cloud platform 18(3), which may comprise a tier 1 cloud platform (e.g., Amazon AWS). Various other configurations and cloud platforms may be included within the broad scope of the embodiments.

Figure 7:
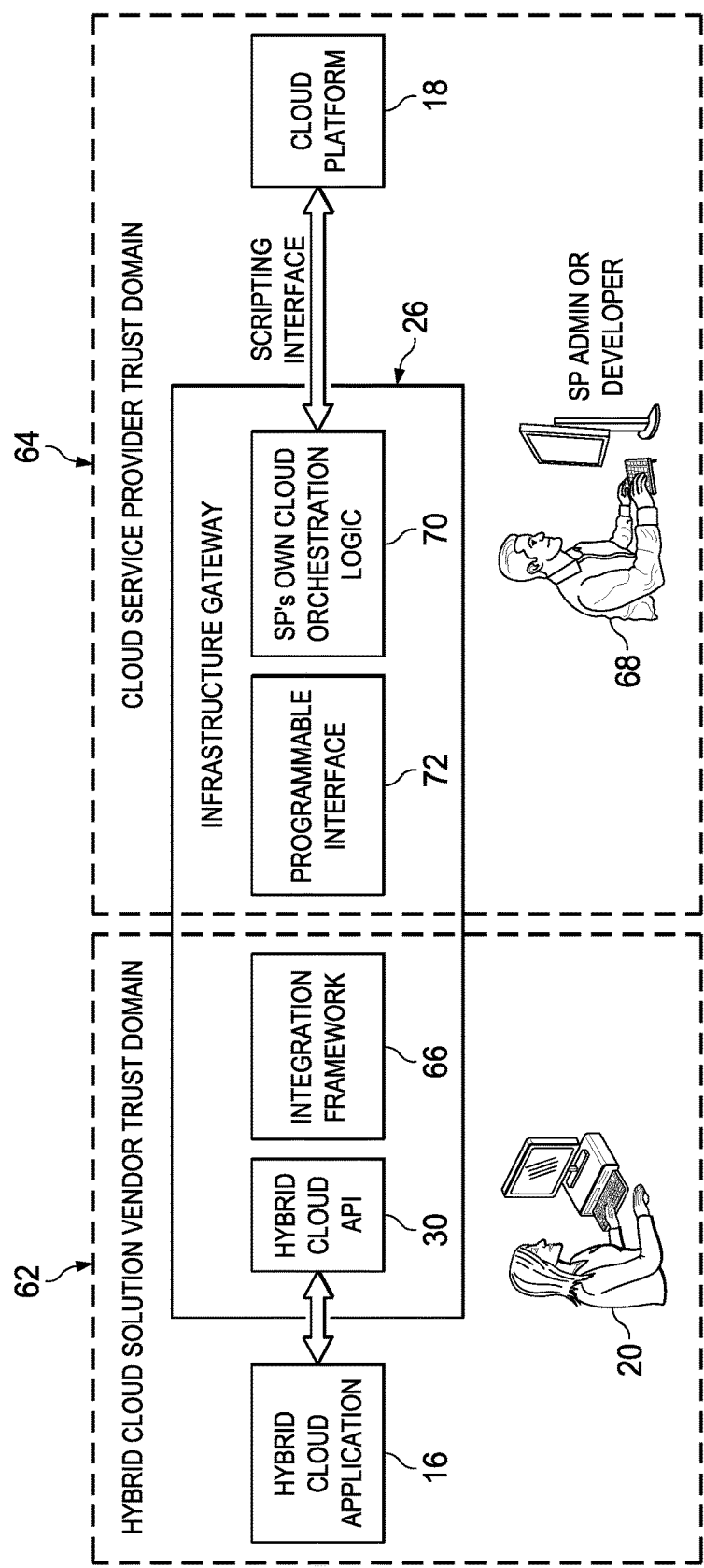
FIG. 7 is a simplified block diagram illustrating yet other example details of embodiments of the communication system.

Turning to FIG. 7, FIG. 7 is a simplified block diagram illustrating example details according to an embodiment of communication system 10. According to an embodiment of communication system 10, infrastructure gateway 26 also provides a trust model for integration between hybrid cloud solution vendor 20 and cloud service provider 22 who deploys infrastructure gateway 26 in public cloud 14. Due to well defined integration interfaces, hybrid cloud solution vendor 20 can ship infrastructure gateway 26 and a programming guideline for cloud service provider 22 to inject proprietary cloud orchestration logic thereto.

In the trust model, hybrid cloud solution vendor 20 produces and ships hybrid cloud application 16 and infrastructure gateway 26 to various cloud service providers, but does not have to share any intellectual property and core software source of the product with the cloud service provider customers. The cloud service providers can program infrastructure gateway 26 based on the programming guide provided and their respective proprietary cloud orchestration secret sauce. However, once both parties have done their share of integration effort, the cloud service providers could offer hybrid cloud application 16 to their customers as a service.

The trust model essentially identifies two trust domains, 62 and 64, which have a clear boundary between them. Embodiments of communication system 10 may maintain separate trust domains 62 and 64 corresponding to cloud solution vendor 20 and cloud service provider 22. In an example embodiment, hybrid cloud solution vendor 20 may configure infrastructure gateway 16 with hybrid cloud API 30 to interface with hybrid cloud application 16. Hybrid cloud solution vendor 20 may also program integration framework 66 with appropriate adapter SDK abstract classes 50 and generate SDK 52 accordingly. Hybrid cloud solution vendor 20 may supply infrastructure gateway 26 to cloud service provider 22. A service provider administrator or developer 68 at cloud service provider 22 may program infrastructure gateway 26 using the service provider's own cloud orchestration logic 70 on a programmable interface 72 (e.g., using SDK 52) for compatibility with cloud platform 18. For example, cloud orchestration logic 70 may involve translating instructions interpreted by hybrid cloud API and provided as part of a SDK abstract class into appropriate scripts that run on cloud platform 18.

Figure 8:
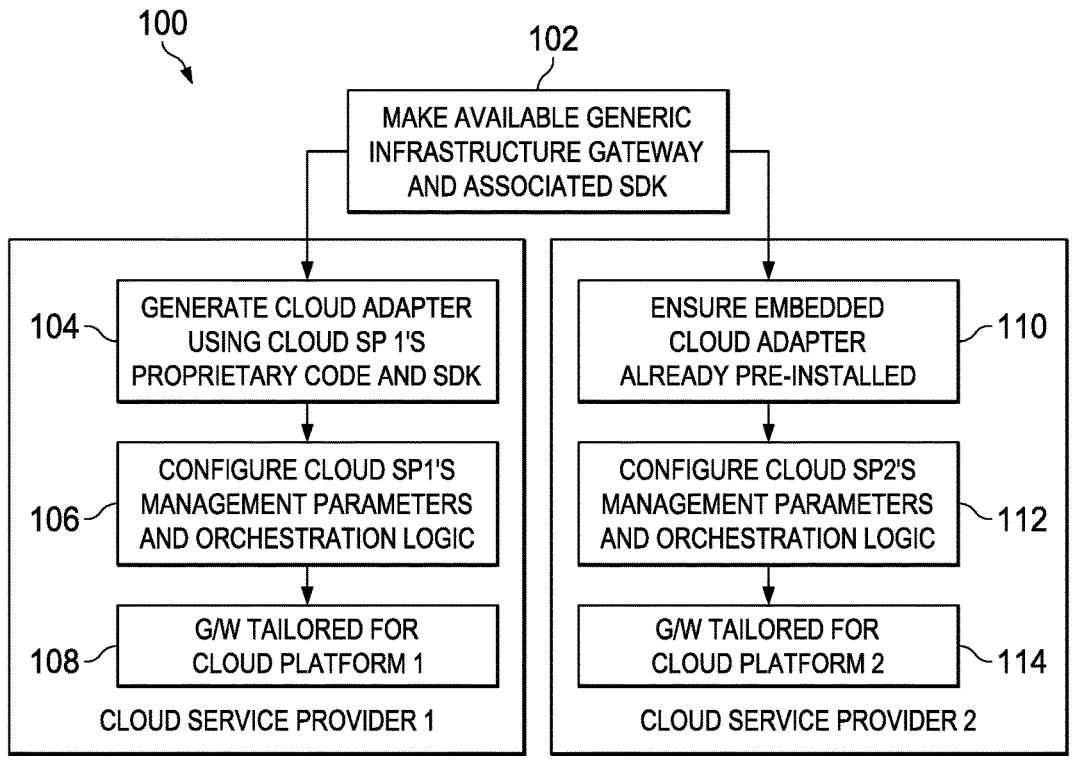
FIG. 8 is a simplified flow diagram illustrating example operations that may be associated with an embodiment of the communication system.

Turning to FIG. 8, FIG. 8 is a simplified flow diagram illustrating example operations 100 that may be associated with an embodiment of communication system 10. At 102, a generic (non-programmed) infrastructure gateway 26 and associated SDK may be made available. Assume, merely for example purposes, that cloud service provider 1 manages proprietary cloud platform 1 and cloud service provider 2 manages open source cloud platform 2. If infrastructure gateway 26 is made available to cloud service provider 1, at 104, a custom cloud adapter (e.g., 38(5)) may be generated using cloud service provider 1's proprietary code and SDK provided with infrastructure gateway 26. At 106, infrastructure gateway 26 can be programmed with cloud service provider 1's management parameters and orchestration logic. At 108, infrastructure gateway 26 may be tailored for cloud platform 1 (serviced by cloud service provider 1).

On the other hand, if infrastructure gateway 26 is made available to cloud service provider 2, at 110, it may be ensured that embedded open source cloud adapter is already pre-installed. At 112, infrastructure gateway 26 can be programmed with cloud service provider 2's management parameters and orchestration logic. At 114, infrastructure gateway 26 may be tailored for cloud platform 2 (serviced by cloud service provider 2).

Figure 9:
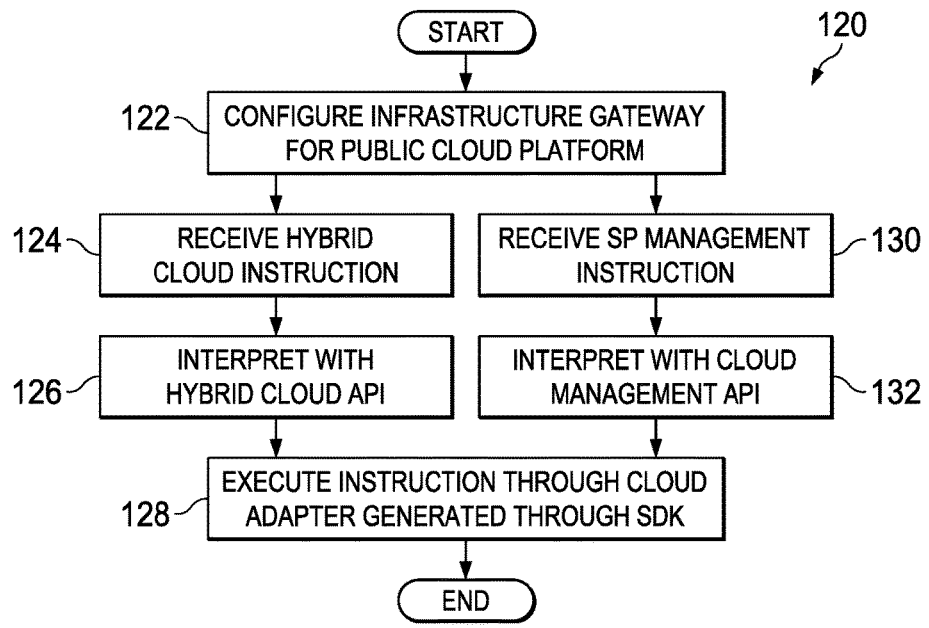
FIG. 9 is a simplified flow diagram illustrating other example operations that may be associated with an embodiment of the communication system.

Turning to FIG. 9, FIG. 9 is a simplified flow diagram illustrating example operations 120 that may be associated with an embodiment of communication system 10. At 122, infrastructure gateway 26 may be configured for specific public cloud platform 18. At 124, a hybrid cloud instruction may be received. At 126, hybrid cloud API 30 may interpret the instruction. At 128, the instruction may be executed through cloud adapter (e.g., 38(5)) generated through the SDK. At 130, a management instruction may be received from management portal 24. The management instruction may include configurations for provisioning cloud platform instances and/or tenants in public cloud 14. At 132, cloud management API 32 may interpret the instruction. At 128, the instruction may be executed through cloud adapter (e.g., 38(5)) generated through the SDK.

Figure 10:
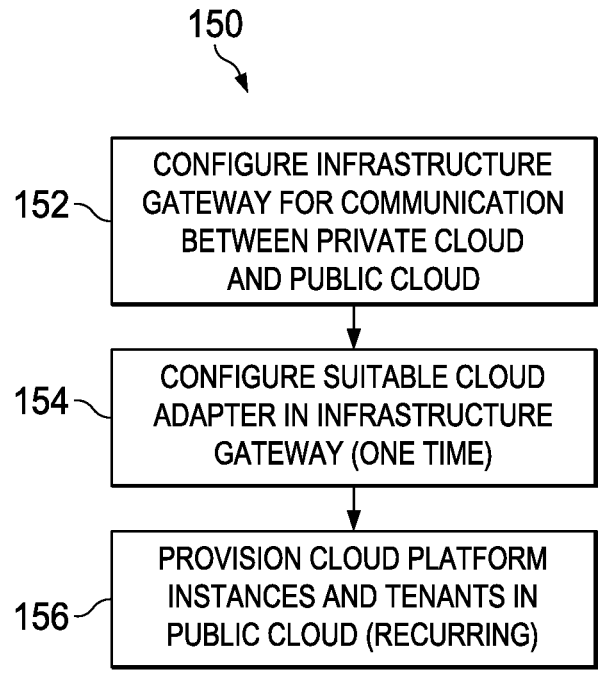
FIG. 10 is a simplified flow diagram illustrating other example operations that may be associated with an embodiment of the communication system.

Turning to FIG. 10, FIG. 10 is a simplified flow diagram illustrating example operations 150 associated with configuring infrastructure gateway 26 according to embodiments of communication system 10. At 152, infrastructure gateway 26 may be configured for communicating with private cloud 12 and public cloud 14. The configuration may involve setting appropriate network interfaces to enable connections to private cloud 12 and public cloud 14.

At 154, a suitable cloud adapter 38 may be configured in infrastructure gateway 26. For example, cloud adapter 38 may comprise a custom adapter uniquely configured for cloud platform 18 of a particular service provider 22. In another example, cloud adapter 38 may comprise an open source adapter, which may be configured appropriately for the particular cloud platform 18 of service provider 22. The configuration may be a one-time effort in some embodiments. For example, after cloud adapter 38 is configured, it may remain unchanged for the duration of its service to public cloud 14. At 156, service provider 22 may provision infrastructure gateway 26 with cloud platform instances and tenants in public cloud 14. Such an operation may require recurring effort, with tenants and resources added or removed on an as-needed basis.

Figure 11:
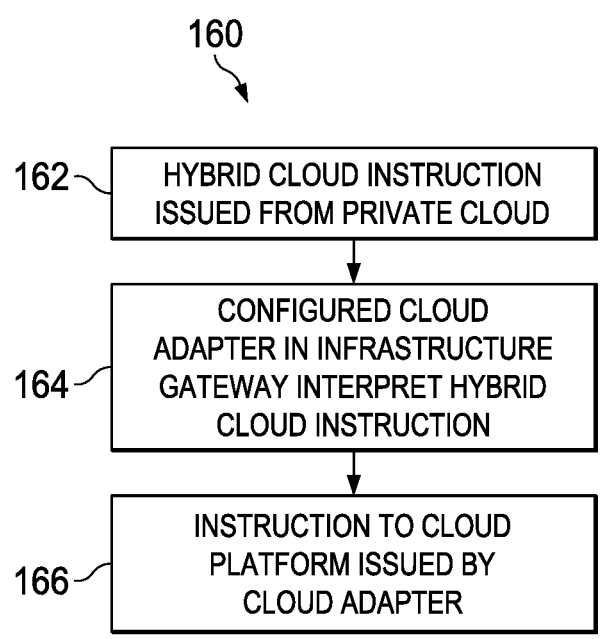
FIG. 11 is a simplified flow diagram illustrating other example operations that may be associated with an embodiment of the communication system.

Turning to FIG. 11, FIG. 11 is a simplified flow diagram illustrating example operations 160 associated with using infrastructure gateway 26 according to embodiment of communication system 10. At 162, a hybrid cloud instruction may be received from private cloud 12 at infrastructure gateway 26. In some embodiments, the hybrid cloud instruction may include management, configuration, or other instructions, tailored to provision cloud platform 18 for particular workloads and applications on behalf of private cloud 12. At 164, configured cloud adapter 38 in infrastructure gateway 26 may interpret the hybrid cloud instruction. At 166, cloud adapter 38 may issue an appropriate instruction (translated from the hybrid cloud instruction) to public cloud platform 18.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, infrastructure gateway 26. In some embodiments, one or more of these features may be implemented in hardware, provided external to these elements, or consolidated in any appropriate manner to achieve the intended functionality. The various network elements (e.g., infrastructure gateway 26) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, infrastructure gateway 26 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 44) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 46) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

The invention claimed is:

1. A method for controlling a gateway to facilitate communications between a public cloud and a private cloud in a hybrid cloud, the gateway configured to generate a plurality of cloud adapters using a cloud adapter software development kit (SDK), the method comprising:
generating, using the cloud adapter SDK with proprietary cloud orchestration code of a platform of the public cloud, a specific cloud adapter tailored to work exclusively with a specific public cloud platform of the public cloud;
receiving a hybrid cloud instruction from a hybrid cloud application executing in the private cloud;
interpreting, using the specific cloud adapter generated via the cloud adapter SDK, the hybrid cloud instruction according to a hybrid cloud application programming interface (API) to yield an interpreted hybrid cloud instruction;
receiving a management instruction from a public cloud management portal associated with the public cloud;
interpreting the management instruction according to a cloud management API to yield an interpreted management instruction; and
executing the interpreted hybrid cloud instruction and the interpreted management instruction in the public cloud using the specific cloud adapter.

2. The method of claim 1, wherein the cloud management API comprises at least one function selected from a group including: (a) provisioning computing resources in the public cloud for various users, (b) monitoring resource usage, (c) metering resource usage, (d) configuring appliances in the public cloud, and (e) analyzing resource usage in the public cloud.

3. The method of claim 1, wherein the generating comprises:
implementing a set of abstract classes in the specific cloud adapter for processing a hybrid cloud instruction;
implementing specific functions using the set of abstract classes for compatibility with the platform of the public cloud; and
configuring management parameters and cloud orchestration code of the specific cloud adapter for the platform of the public cloud,
wherein,
the specific cloud adapter is configured to work exclusively with the platform of the public cloud.

4. The method of claim 1, wherein the SDK comprises a set of abstract classes inheritable by the plurality of cloud adapters as sub-classes suited to respective codes of the plurality of cloud adapters.

5. The method of claim 4, wherein each of the plurality of cloud adapters that inherits the set of abstract classes implements actual functions of corresponding sub-classes.

6. The method of claim 1,
wherein:
each of the plurality of cloud adapters conforms to a different public cloud platform managed by a different cloud service provider;
at least one of the cloud adapters comprises an embedded pre-installed cloud adapter; and
at least another of the cloud adapters comprises a programmable cloud adapter tailored for the platform of the public cloud.

7. The method of claim 1, further comprising:
providing substantially identical copies of the gateway to different cloud service providers who manage disparate public cloud platforms,
wherein each copy of the gateway is programmed differently to generate corresponding cloud adapters compatible with respective ones of the public cloud platforms.

8. At least one non-transitory computer readable medium storing instructions for controlling a gateway to facilitate communications between a public cloud and a private cloud in a hybrid cloud, the gateway configured to generate a plurality of cloud adapters using a cloud adapter software development kit (SDK), the instructions when executed by a processor cause the processor to perform operations comprising:

generating, using the cloud adapter SDK with proprietary cloud orchestration code of a platform of the public cloud, a specific cloud adapter tailored to work exclusively with a specific public cloud platform of the public cloud;

receiving a hybrid cloud instruction from a hybrid cloud application executing in the private cloud;

interpreting, using the specific cloud adapter generated via the cloud adapter SDK, the hybrid cloud instruction according to a hybrid cloud application programming interface (API) to yield an interpreted hybrid cloud instruction;

receiving a management instruction from a public cloud management portal associated with the public cloud;

interpreting the management instruction according to a cloud management API to yield an interpreted management instruction; and executing the interpreted hybrid cloud instruction in the public cloud using the specific cloud adapter.

9. The medium storing instructions of claim 8, wherein the cloud management API comprises at least one function selected from a group including: (a) provisioning computing resources in the public cloud for various users, (b) monitoring resource usage, (c) metering resource usage, (d) configuring appliances in the public cloud, and (e) analyzing resource usage in the public cloud.

10. The medium storing instructions of claim 8, wherein the instructions for generating comprises instructions for:

implementing a set of abstract classes in the specific cloud adapter for processing a hybrid cloud instruction;

implementing specific functions using the set of abstract classes for compatibility with the platform of the public cloud; and configuring management parameters and cloud orchestration code of the specific cloud adapter for the platform of the public cloud, wherein, the specific cloud adapter is configured to work exclusively with the platform of the public cloud.

11. The medium storing instructions of claim 8, wherein the SDK comprises a set of abstract classes inheritable by the plurality of cloud adapters as sub-classes suited to respective codes of the plurality of cloud adapters.

12. The medium storing instructions of claim 11, wherein each of the plurality of cloud adapters that inherits the set of abstract classes implements actual functions of corresponding sub-classes.

13. The medium storing instructions of claim 8, wherein:

the gateway comprises the plurality of cloud adapters including the specific cloud adapter;

each of the plurality of cloud adapters conforms to a different public cloud platform managed by a different cloud service provider;

at least one of the cloud adapters comprises an embedded pre-installed cloud adapter; and at least another of the cloud adapters comprises a programmable cloud adapter tailored for the platform of the public cloud.

14. The medium storing instructions of claim 8, including instructions when executed by the processor cause the processor to perform operations further comprising:

providing substantially identical copies of the gateway to different cloud service providers who manage disparate public cloud platforms, wherein each copy of the gateway is programmed differently to generate corresponding cloud adapters compatible with respective ones of the public cloud platforms.

15. A system including a gateway to facilitate communications between a public cloud and a private cloud in a hybrid cloud, the gateway configured to generate a plurality of cloud adapters using a cloud adapter software development kit (SDK), the gateway comprising:

at least one memory configured to store data; and at least one processor operable to execute instructions associated with the data, which when executed by the at least one processor, causes the processor to perform operations including:

generating, using the cloud adapter SDK with proprietary cloud orchestration code of a platform of the public cloud, a specific cloud adapter tailored to work exclusively with a specific public cloud platform of the public cloud;

receiving a hybrid cloud instruction from a hybrid cloud application executing in the private cloud;

interpreting, using the specific cloud adapter generated via the cloud adapter SDK, the hybrid cloud instruction according to a hybrid cloud application programming interface (API) to yield an interpreted hybrid cloud instruction;

receiving a management instruction from a public cloud management portal associated with the public cloud;

interpreting the management instruction according to a cloud management API to yield an interpreted management instruction; and executing the interpreted hybrid cloud instruction and interpreted management instruction in the public cloud using the specific cloud adapter.

16. The system of claim 15, wherein the cloud management API comprises at least one function selected from a group including: (a) provisioning computing resources in the public cloud for various users, (b) monitoring resource usage, (c) metering resource usage, (d) configuring appliances in the public cloud, and (e) analyzing resource usage in the public cloud.

17. The system of claim 16, wherein the generating comprises:

implementing a set of abstract classes in the specific cloud adapter for processing a hybrid cloud instruction;

implementing specific functions using the set of abstract classes for compatibility with the platform of the public cloud; and configuring management parameters and cloud orchestration code of the specific cloud adapter for the platform of the public cloud, wherein, the specific cloud adapter is configured to work exclusively with the platform of the public cloud.

18. The system of claim 16, wherein the SDK comprises a set of abstract classes inheritable by the plurality of cloud adapters as sub-classes suited to respective codes of the plurality of cloud adapters.

19. The system of claim 18, wherein each of the plurality of cloud adapters that inherits the set of abstract classes implements actual functions of corresponding sub-classes.

20. The system of claim 15, wherein:

each of the plurality of cloud adapters conforms to a different public cloud platform managed by a different cloud service provider;

at least one of the cloud adapters comprises an embedded pre-installed cloud adapter; and at least another of the cloud adapters comprises a programmable cloud adapter tailored for the platform of the public cloud.

\* \* \* \* \*